G. ALEXANDER.
Tongue Support.
No. 94,989. Patented Sept. 21, 1869.
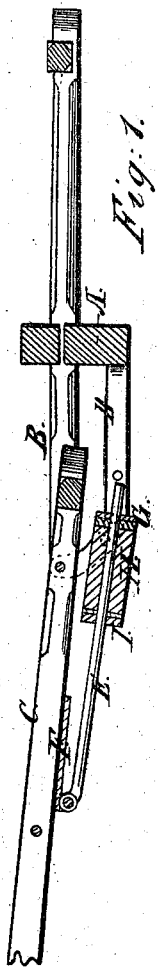
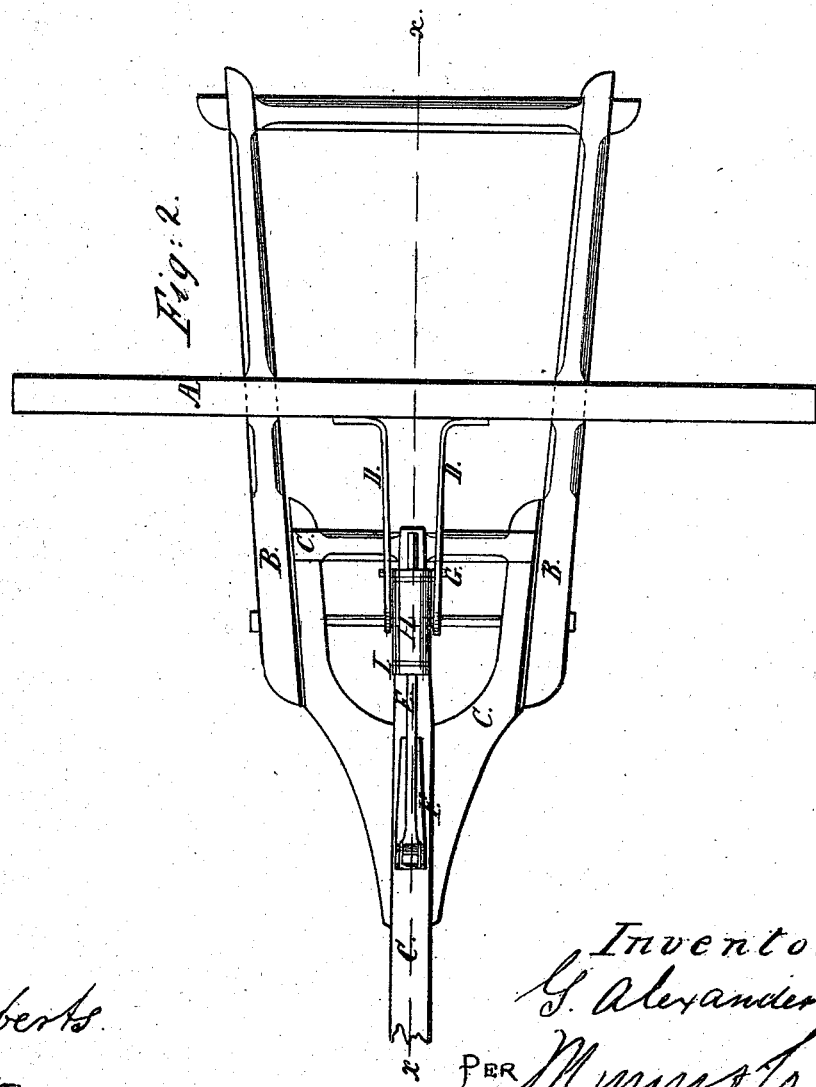

United States Patent Office.

GEORGE ALEXANDER, OF ROMNEY, INDIANA.

Letters Patent No. 94,989, dated September 21, 1869.

IMPROVED WAGON-TONGUE SUPPORT

The Schedule referred to in these Letters Patent and making part of the same.

*To all whom it may concern:*

Be it known that I, GEORGE ALEXANDER, of Romney, in the county of Tippecanoe, and State of Indiana, have invented a new and useful Improvement in Springs for Wagon-Tongues; and I do hereby declare that the following is a full, clear, and exact description thereof, which will enable those skilled in the art to make and use the same, reference being had to the accompanying drawings, forming part of this specification.

Figure 1 is a vertical section of the forward part of a wagon-gearing to which my improvement has been attached, taken through the line $x$ $x$, fig. 2.

Figure 2 is an under-side view of the same.

Similar letters of reference indicate corresponding parts.

My invention has for its object to furnish an improved attachment for the fore part of a wagon-gearing, by means of which the tongue may be supported at a greater or less elevation, as desired, so as to relieve the horses' necks from the weight of the tongue, and, in a great measure, protect them from the threshing of the tongue when the wheels strike an obstruction; and It consists in the construction and combination of the various parts of the device with the tongue, forward hounds, and axle of the wagon, as hereinafter more fully described.

A represents the forward axle, B the forward hounds, and C the tongue of the wagon, about the construction of which parts there is nothing new.

D are two curved iron bars, the rear ends of which are bolted to the axle A.

The forward ends of the two bars D have holes formed through them, through which passes the bolt or rod by which the tongue C is pivoted to the hounds B.

E is a rod, the forward end of which is connected with the under side of the tongue C by a hinge or shackle, F, as shown in figs. 1 and 2.

The rear end of the rod E passes back through, and works loosely in a hole in the cross-head G, the ends of which enter holes in the curved bars D, several holes being formed in the said bars for the reception of the ends of the said cross-head G, so that it may be moved forward or back, according as it is desired to support the tongue higher or lower.

H is a rubber block or spring placed upon the rod E, the rear end of which rests against the cross-head G, and the forward end of which rests against the disk or collar I, formed upon, or rigidly or adjustably attached to the said rod E.

By this construction the weight of the tongue C will be supported by the elasticity of the rubber spring H, thus greatly relieving the horses.

Having thus described my invention,

What I claim as new, and desire to secure by Letters Patent, is—

The curved bars D, hinged or pivoted rod E, adjustable cross-head G, rubber spring H, and collar I, whether rigid or adjustable, in combination with each other, and with the axle A, hounds B, and tongue C, substantially as herein shown and described, and for the purpose set forth.

GEORGE ALEXANDER.

Witnesses:
W. T. C. HALL,
ELIAS WOODRUFF.